Patented Mar. 30, 1926.

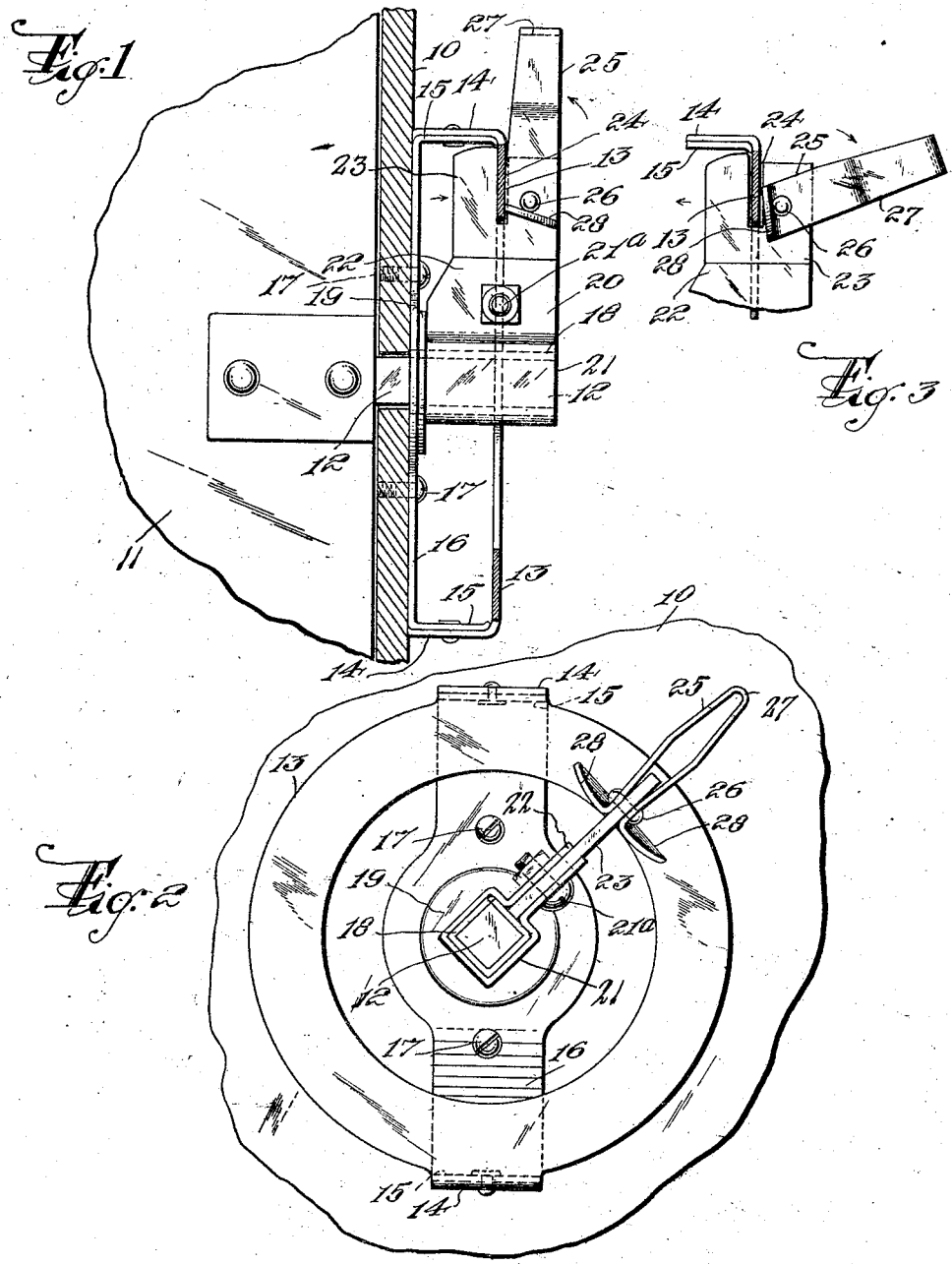

1,578,661

UNITED STATES PATENT OFFICE.

JOHN HRUSOVSKY, OF NEWARK, NEW JERSEY.

DAMPER-SECURING DEVICE.

Application filed August 14, 1925. Serial No. 50,178.

*To all whom it may concern:*

Be it known that JOHN HRUSOVSKY, citizen of Czechoslovakia, residing at Newark, in the county of Essex and State of New Jersey, has invented certain new and useful Improvements in Damper-Securing Devices, of which the following is a specification.

This invention relates to an improved device for securing a damper in adjusted positions in a flue or pipe, the device being applicable to any ordinary damper but particularly adapted for use on a damper which must withstand currents of considerable pressure or velocity.

The invention is illustrated in the accompanying drawing in which Figure 1 is a side view of the device with a flue wall and part of the bracket in section. Figure 2 is a face view of the device shown in Figure 1 and Figure 3 is a detail view of the lever or clamp of the device in its unlocked position.

In the drawings the wall of the flue is indicated at 10 and the damper is shown at 11, the shaft 12 of the damper extending through the wall of the flue. Secured to the wall of the flue is a bracket which comprises a ring-shaped part 13 which is preferably made of stiff sheet metal and is spaced from the wall of the flue by legs 14 secured to the ends 15 of the plate 16 which in turn is secured by rivets or screws 17. The plate 16 has a central opening through which the shaft projects and a sleeve 18 and a flange 19 serve to close this central opening, as the shaft 12 is usually square; in any event, a tight closure at this point is desirable.

The shaft is provided with an arm 20 usually constructed of a sheet metal sleeve 21 formed by metal bent to enclose the square shaft 12 and the sleeve 18 and clamped by a screw 21ª and with its ends 22 embracing the part 23 which is a stiff metal plate having a slit 24 wide enough to loosely receive the ring-like bracket 13. This permits the free rotation of the arm and therefor of the damper when the device is unlocked.

The lever 25 is pivoted at 26 to the arm and the end 27 projects to form a handle. The other end is proportioned and disposed so that it forms a cam so that when swung in one direction it will bind the ring 13 between the lever and the inside edge of the slit 24.

When swung in the other direction, and in the type shown this other direction is outwardly, the lever will assume the position shown in Figure 3 in which the cam-like or locking end, which is closer to the pivot 26 than the edge 21 of the lever, is opposite the ring-like bracket and the arm and consequently the damper, can be freely swung to any other desired position.

To prevent binding, I prefer to put a rounded face toward the ring-like bracket when the lever is swung to unlocked position, this rounded face being formed in the device illustrated by wings 28, these being provided usually by bending over a strip of metal to form the lever, the ends of the metal being bent to provide the wings 28.

The operation of this device is obvious and it will also be understood that it can be operated at a height from the ground by a hook or ring on the end of a pole which ring can be placed over the lever 25 and applied in moving the lever to its locking or unlocking position or to swing it to move the damper to any adjusted position.

I claim:—

1. A damper securing means comprising a flue, a damper in the flue, including a shaft extending through the wall of the flue, a ring-like bracket on the said wall, and an arm on the shaft and slidable loosely on the bracket, the arm having a slit to loosely receive the ring-like bracket, and a lever pivoted to the arm, the lever having a projecting end to form a handle and having the other end formed into a cam to bind the bracket between one edge of the slit and said cam.

2. A damper securing device comprising a ring-like bracket with legs to be secured to the wall of a flue to hold the ring spaced from the wall, an arm adapted to rotate with the shaft of a damper, the arm having a slit to loosely receive the inner edge of the ring of the bracket, and a lever pivoted to the arm at the end thereof and having its outer end formed into a handle and its inner end into a cam.

In testimony whereof I affix my signature.

JOHN HRUSOVSKY.